United States Patent [19]

Holzinger et al.

[11] Patent Number: 4,576,418

[45] Date of Patent: Mar. 18, 1986

[54] BRAKE RELEASE MECHANISM FOR VEHICLE TOWING

[75] Inventors: Charles E. Holzinger, Peoria; David M. Fee, Groveland, both of Ill.

[73] Assignee: Caterpillar Tractor Co., Peoria, Ill.

[21] Appl. No.: 630,566

[22] Filed: Jul. 13, 1984

[51] Int. Cl.$^4$ ............................................. B60T 17/18
[52] U.S. Cl. ........................................... 303/71; 303/9
[58] Field of Search ................. 303/2, 6 M, 9, 29, 56, 303/71, 80, 85

[56] References Cited

U.S. PATENT DOCUMENTS

| | | | |
|---|---|---|---|
| 3,110,523 | 11/1963 | Johnson | 303/71 |
| 3,136,399 | 6/1964 | Granryd | 192/4 |
| 3,740,106 | 6/1973 | Horowitz | 303/71 |
| 3,854,559 | 12/1974 | Talak et al. | 192/4 A |
| 3,944,295 | 3/1976 | Lloyd et al. | 303/89 |
| 4,020,932 | 5/1977 | Windish | 192/4 A |
| 4,123,906 | 11/1978 | Durgan et al. | 60/403 |
| 4,195,716 | 4/1980 | Wirt | 192/3 R |
| 4,307,917 | 12/1981 | Hasselbacher et al. | 303/71 |

*Primary Examiner*—Duane A. Reger
*Attorney, Agent, or Firm*—J. W. Burrows

[57] ABSTRACT

Spring-applied, pressure-released brakes are useful, for example, in construction vehicles or other vehicles that require an automatic braking in the event of an engine failure. In order to tow the vehicle for service, the brakes must be released. Most brake release systems require an alternate pump and associated valves on each vehicle with the fluid from the alternate pump being controlled by the brake valve on the vehicle. The alternate pump on each vehicle add cost to the vehicle and the spool of the brake valve is a known path for fluid leakage thus requiring an alternate pump of a larger capacity than is actually needed. The present brake release mechanism provides an isolating mechanism that is effective to isolate a work port of a brake valve from a valving element in a housing. The isolating mechanism is adapted to connect with an alternate source of pressurized fluid and adapted to direct the pressurized fluid to a brake for release thereof. The isolating mechanism and the alternate source of pressurized fluid are adaptable to several vehicles thus eliminating the need of the alternate pump and associated valves on each vehicle. Furthermore, the alternate source is smaller in capacity since the leakage in the brake valve during towing is eliminated.

11 Claims, 3 Drawing Figures

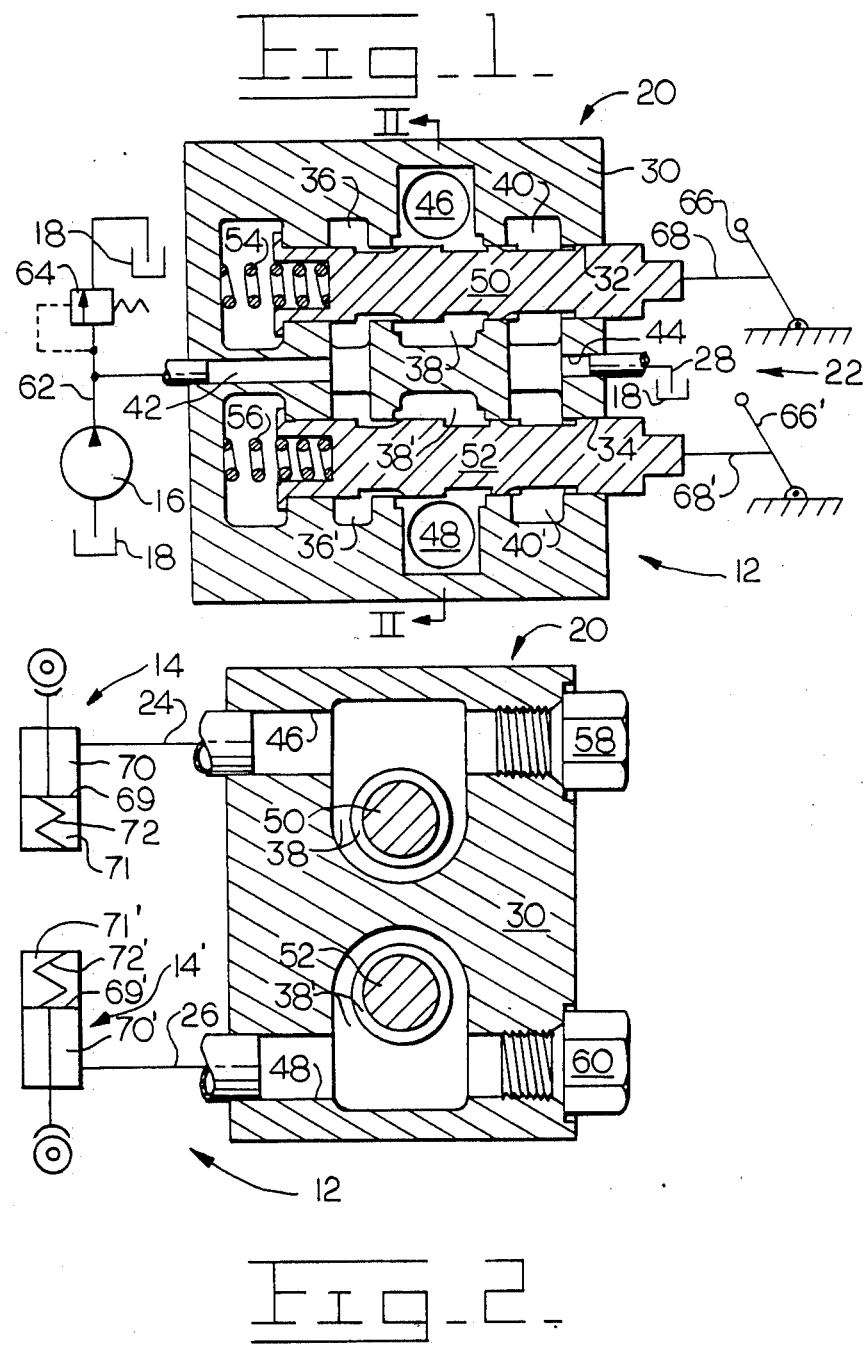

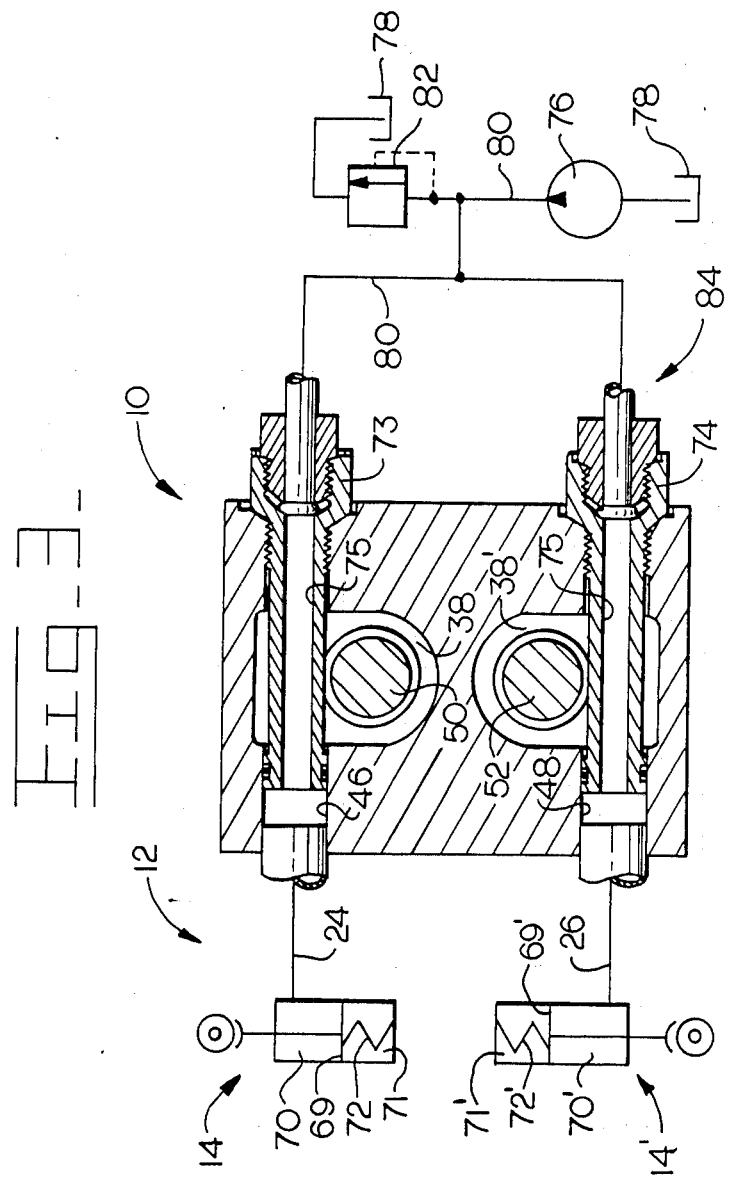

BRAKE RELEASE MECHANISM FOR VEHICLE TOWING

TECHNICAL FIELD

This invention relates generally to a brake release mechanism for towing a disabled vehicle having spring applied pressure released brakes and more particularly to a brake release mechanism that provides pressurized fluid to release the brakes during towing while bypassing the brake valve.

BACKGROUND ART

Brake release mechanisms are provided on vehicles having spring applied, pressure released brakes in order to release the brakes for towing in the event that the vehicle becomes disabled. Many of the well known brake release mechanisms are mounted directly on the vehicle, thus requiring various components for each vehicle. These components; such as, control valves, check valves, manual shutoff valves, auxiliary hand pumps and associated lines add complexity and extra cost to each vehicle. Other brake release mechanisms that are not mounted directly on the vehicle are normally coupled to the existing lines and uses the vehicle brake control valve to release the brakes. These mechanisms experience varying degrees of leakage due to the pressurized fluid from the auxiliary pump being directed through the brake control valve. Consequently, a larger source of pressurized auxiliary fluid is needed to maintain the brakes in the released condition while towing the vehicle.

The present invention is directed to overcoming one or more of the problems as set forth above.

DISCLOSURE OF THE INVENTION

In one aspect of the present invention, a brake release mechanism is provided for use in a vehicle having a spring applied, pressure released brake, a primary source of pressurized fluid, a reservoir and a brake valve. The brake valve has a housing defining a bore, an inlet port connected to the source, a work port connected to the brake and a drain port connected to the reservoir. Each of the ports intersect the bore at axially spaced locations. A valving element is located in the bore and selectively movable between first and second positions. In the first position of the valving element, the work port is in open communication with the inlet port while being blocked from the drain port. In the second position of the valving element, the work port is blocked from the inlet port and in open communication with the drain port. A means is provided for isolating the work port from the valving element and the drain port and is adapted to connect an alternate source of pressurized fluid to the brake so that the brake may be released on failure of the primary source.

The present invention provides a mechanism that may be mounted on the brake valve which isolates the work port from the valving element and the drain port thus eliminating leakage of the alternate source of pressurized fluid by bypassing the valving element. Furthermore, this mechanism is adaptable to the brake valve of various vehicles thus not requiring an auxiliary pump and the various valves associated therewith be mounted on every vehicle.

BRIEF DESCRIPTION OF THE DRAWINGS

FIGS. 1 and 2 are partial schematic and diagrammatic representations of a brake control system for use on a vehicle having spring applied pressure release brakes; and FIG. 3 is a partial schematic and diagrammatic representation of the brake valve shown in FIGS. 1 and 2 incorporating the mechanism of the present invention.

BEST MODE FOR CARRYING OUT THE INVENTION

Referring now to the drawings, a brake release mechanism 10 is shown for use in a brake control system 12 of a vehicle (not shown) having spring applied pressure-released brakes 14,14'. As more specifically shown in FIGS. 1 and 2, the brake control system 12 includes a source of pressurized fluid, such as a pump 16, a reservoir 18, a brake control valve 20 and an operator input mechanism 22. The brake valve 20 is connected to the spring applied brakes 14,14' respectively by conduits 24,26. A drain conduit 28 connects the reservoir 18 to the brake valve 20.

The brake valve 20 includes a housing 30 having first and second bores 32,34 defined therein. First, second and third chambers 36,38,40 respectively surround the first bore 32 at axially spaced locations. Since the second bore 34 is identical to the first bore 32, prime numbers are used to identify corresponding chambers 36',38',40'. An inlet port 42 is defined in the housing 30 and intersects the first chamber 36,36' of each of the first and second bores 32,34. A drain port 44 is defined in the housing 30 and connects the third chamber 40,40' of each of the first and second bores 32,34 to the drain conduit 28. A first work port 46 is defined in the housing 30 and intersects the second chamber 38 of the first bore 32. The conduit 24 is connected to the first work port 46. A second work port 48 is defined in the housing 30 and intersects the second chamber 38' of the second bore 34. The conduit 26 is connected to the second work port 48. As shown in FIG. 1, the first and second work ports 46,48 are oriented transversely to the respective first and second bores 32,34 and are respectively laterally offset. It is recognized that the first and second work ports 46,48 could be at different angles with respect to the respective first and second bores 32,34 as long as they do not intersect either of the first and third chambers 36,36',40,40' of the first and second bores 32,34.

First and second valving elements, such as first and second spools 50,52 are respectively slideably disposed in the first and second bores 32,34. Each of the spools 50,52 is movable between first and second positions. A spring 54 biases the first spool 50 to the first position while spring 56 biases the second spool 52 to its first position. As is well known in the art and clearly shown in FIG. 1, each of the spools 50,52 controls the fluid flow to and from the brakes 14,14'.

As shown in FIG. 2, first and second plugs 58,60 are respectively disposed in the end of the respective work ports 46,48 opposite the connection of the conduits 24,26.

A conduit 62 connects the pump 16 to the inlet port 42 of the brake valve 20. As is well known in the art, a relief valve 64 is connected to the conduit 62 and adapted to control the maximum pressure level of the fluid from the pump 16.

The operator input mechanism 22 includes first and second pedals 66,66' each respectively connected to the respective spools 50,52 by associated linkages 68,68'.

The spring-applied, pressure-released brakes 14,14' each include an actuator 69 having a pressure chamber 70, a spring chamber 71, and a spring 72 located in the spring chamber 71.

As shown in FIG. 3, the plugs 58,60 have been removed and replaced with first and second sleeve members 73,74. Each of the sleeve members 73,74 has an axial passage 75 extending therethrough. The sleeve members 73,74 are each sealingly disposed in the respective work port 46,48. Each of the sleeve members 73,74 has sufficient length to extend into and through the respective second chamber 38,38' to effectively isolate the work ports 46,48 from the spools 50,52.

An alternate source of pressurized fluid, such as a pump 76, draws fluid from a reservoir 78 and directs the pressurized fluid to the first and second sleeve members 73,74 through a conduit 80. The pump 76 may be a hand pump or driven by an electric motor (not shown) or any other suitable means. A relief valve 82 is connected to the conduit 80 and controls the maximum pressure level of the fluid from the pump 76 in a well known manner.

The sleeve member 73/74 constitutes a means 84 for isolating the work port 46/48 from the valving element 50/52 and the drain port 44 and for connecting the alternate source 76 to the brake 14/14'.

It is recognized that a brake system having only one brake and one valving element would need only one sleeve member. Furthermore, the alternate source 73 of pressurized fluid could be connected to the brake conduit 24/26 without being directed through the sleeve member 80/82. Consequently, the axial bore 75 of the sleeve member 80/82 would be plugged.

INDUSTRIAL APPLICABILITY

During normal operation of a vehicle having spring-applied, pressure-released brakes, pressurized fluid from the pump 16 is directed through the brake valve 20 to the pressure chambers 70,70' of the brakes 14,14'. The force from the pressurized fluid acts against the bias of the respective springs 72,72' to release the brakes. To apply the brakes 14,14', the operator depresses the pedals 66,66', either individually or simultaneously, thus moving the spools 50,52 from their first position, at which the work ports 46,48 communicate with the inlet port 42 and are blocked from the drain port 44, to the second position, at which the work ports 46,48 are blocked from the inlet port 42 and open to the drain port 44. Between the first and second positions of the spools 50,52, the fluid flow to the brakes 14,14' is variable controlled. By venting the pressurized fluid from the pressure chambers 70,70' of the brakes 14,14', the force of the springs 72,72' applies the brakes 14,14'.

Upon failure of the pump 16 or if the engine of the vehicle stops running, the pressurized fluid in the pressure chambers 70,70' drops thus applying the brakes 14,14'. In order to move the vehicle, the brakes must be released. The plugs 58,60 as shown in FIG. 2 are removed and the sleeve members 73,74 are inserted in the work ports 46,48 as shown in FIG. 3. The alternate source 76 of pressurized fluid is connected to the sleeve members 73,74 by the conduit 80. The sleeve members 73,74 effectively isolate the spools 50,52 from the alternate source 76 thus eliminating leakage across the spools 50,52. The pressurized fluid from the alternate source 76 is directed to the pressure chambers 70,70' thus releasing the brakes 14,14' for towing. Due to the small volume of fluid needed to release the brakes 14,14' without concern about leakage, the alternate source 76 is relatively small in size.

Once the vehicle has been towed to its destination, the alternate source 76 is shut off and the conduit 80 rexoved. The sleeve members 73,74 are then removed and replaced by the plugs 58,60. The brake system is now ready for normal operation once the problem is resolved.

The brake release mechanism set forth above provides an arrangement that does not require that an extra pump and associated valving be supplied on every vehicle. The service technician would only need the two sleeve members 73,74, the conduit 80 and the alternate source 76 to tow several different vehicles without needing numerous special service items. Furthermore, since the work ports are isolated from the spools, the normal leakage is eliminated thus allowing the use of a small alternate source.

Other aspects, objects and advantages of this invention can be obtained from a study of the drawings, the disclosure and the appended claims.

We claim:

1. In a brake release mechanism adapted for use in a vehicle having a spring-applied, pressure-released brake, a primary source of pressurized fluid, a reservoir, and a brake valve having a housing and a valving element, said housing having a bore defined in the housing, an inlet port connected to said source, a work port connected to said brake, and a drain port connected to said reservoir, each of said ports intersecting the bore at axially spaced locations, and said valving element being selectively movable in said bore between a first position at which said work port is in open communication with said inlet port while being blocked from said drain port and a second position at which said work port is blocked from said inlet port while being in open communication with said drain port, the improvement comprising:

means for isolating said work port from said valving element and said drain port, said isolating means being adaptable to connect an alternate source of pressurized fluid to said brake so that said brake is released upon failure of said primary source.

2. The brake release mechanism, as set forth in claim 1, wherein said housing includes a chamber which surrounds a portion of said bore and connects with said work port, and said isolating means includes a sleeve member adapted for insertion into said work port so that communication between said work port and the valving element in the bore is blocked.

3. The brake release mechanism, as set forth in claim 2, wherein said sleeve member is connectable to said alternate source of pressurized fluid and defines an axial passage therethrough, said axial passage in said sleeve member connects said alternate source of pressurized fluid directly with said brake through said work port.

4. The brake release mechanism, as set forth in claim 3, wherein said valving element is spring biased to the first position and movable to the second postion in response to a manual input mechanism.

5. The brake release mechanism, as set forth in claim 2, including a plug member adapted for insertion into one end of the work port when the primary source of pressurized fluid is operating.

6. In a brake release mechanism adapted for use in a vehicle having first and second spring-applied, pressure-released brakes, a primary source of pressurized fluid, a reservoir, and a brake valve having a housing and first and second valving elements, said housing having first and second bores defined in the housing, an inlet port connected to said source and intersecting each of said first and second bores, a drain port connected to said reservoir and intersecting each of said first and second bores axially spaced from the intersection of the inlet port, a first work port connected to the first brake and intersecting the first bore at a location between the intersection of the inlet and outlet ports, a second work port connected to the second brake and intersecting the second bore at a location between the intersection of the inlet and outlet ports, and said first and second valving elements each being selectively movable in the respective first and second bores between a first position at which said respective work ports are in open communication with said inlet port while being blocked from said drain port and a second position at which said respective work ports are blocked from said inlet port while being in open communication with said drain port, the improvement comprising:

an alternate source of pressurized fluid; and means for isolating each of said work ports from their respective valving elements and said drain port and for connecting the alternate source to said first and second brakes so that said brakes are released upon failure of said primary source.

7. The brake release mechanism, as set forth in claim 6, wherein said housing includes first and second chambers each surrounding a portion of the respective first and second bores and connecting with the respective work ports, and said isolating means includes first and second sleeve member adapted for insertion into the respective work ports so that communication between the respective work ports and the valving elements in each of the first and second bores are blocked.

8. The brake release mechanism, as set forth in claim 7, wherein each of said first and second sleeve members are connected to said alternate source of pressurized fluid and each defines an axial passage therethrough, said axial passage in the respective sleeve members connect said alternate source directly with the respective brakes through the respective work ports.

9. In a brake release mechanism adapted for use in a vehicle having a spring-applied, pressure-released brake, a primary source of pressurized fluid, a reservoir, and a brake valve having a housing and a valving element, said housing having a bore defined in the housing, an inlet port connected to said source, a work port connected to said brake, and a drain port connected to said reservoir, each of said ports intersecting the bore at axially spaced locations, and said valving element being selectively movable in said bore between a first position at which said work port is in open communication with said inlet port while being blocked from said drain port and a second position at which said work port is blocked from said inlet port while being in open communication with said drain port, the improvement comprising:

an alternate source of pressurized fluid; and means for isolating said work port from said valving element and said drain port and for connecting the alternate source of pressurized fluid to said brake so that said brake is released upon failure of said primary source.

10. The brake release mechanism, as set forth in claim 9, wherein said housing includes a chamber which surrounds a portion of said bore and connects with said work port, and said isolating means includes a sleeve member adapted for insertion into said work port so that communication between said work port and the valving element in the bore is blocked.

11. The brake release mechanism, as set forth in claim 10, wherein said sleeve member is connected to said alternate source of pressurized fluid and defines an axial passage therethrough, said axial passage in said sleeve member connects said alternate source of pressurized fluid directly with said brake through said work port.

* * * * *